(12) United States Patent
Jin et al.

(10) Patent No.: US 10,623,689 B2
(45) Date of Patent: Apr. 14, 2020

(54) TIME-LAPSE PHOTOGRAPHING CONTROL METHOD AND APPARATUS, READABLE STORAGE MEDIUM, AND CAMERA

(71) Applicant: Shanghai Xiaoyi Technology Co., Ltd., Shanghai (CN)

(72) Inventors: Li Jin, Shanghai (CN); Xuewu Zhang, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/128,726

(22) Filed: Sep. 12, 2018

(65) Prior Publication Data

US 2019/0110019 A1  Apr. 11, 2019

(30) Foreign Application Priority Data

Oct. 10, 2017  (CN) .......................... 2017 1 0933763

(51) Int. Cl.
| | |
|---|---|
| H04N 5/77 | (2006.01) |
| H04N 5/915 | (2006.01) |
| H04N 5/232 | (2006.01) |
| H04N 5/783 | (2006.01) |
| H04N 1/00 | (2006.01) |
| H04N 9/80 | (2006.01) |

(52) U.S. Cl.
CPC .............. *H04N 5/915* (2013.01); *H04N 1/00* (2013.01); *H04N 5/232* (2013.01); *H04N 5/23225* (2013.01); *H04N 5/232411* (2018.08); *H04N 5/77* (2013.01); *H04N 5/783* (2013.01)

(58) Field of Classification Search
USPC .................................................. 386/226, 248
See application file for complete search history.

(56) References Cited

U.S. PATENT DOCUMENTS

| | | |
|---|---|---|
| 6,002,436 A | 12/1999 | Anderson |
| 9,188,432 B2 * | 11/2015 | Yamada .................... B25J 11/00 |

(Continued)

FOREIGN PATENT DOCUMENTS

JP   2015-29188   2/2015

OTHER PUBLICATIONS

Extended European Search Report issued in counterpart European Patent Application No. 18199431.0, dated Mar. 6, 2019.

*Primary Examiner* — Nigar Chowdhury
(74) *Attorney, Agent, or Firm* — Cantor Colburn LLP

(57) ABSTRACT

Embodiments of the disclosure provide a method, an apparatus, and a readable storage medium for controlling a time-lapse photographing. The method includes detecting whether a time-lapse photographing session has ended; determining a time of a next turning-on of the camera in response to the detection that the session has not ended, the time of the next turning-on of the camera being earlier than a time of a next photographing event, the time of the next photographing event being a sum of a time of a current photographing event and a time interval between photographing events; configuring a real time clock based on the time of the next turning-on of the camera; shutting down the camera; starting up the camera when the time of the next turning-on of the camera is reached; and taking a photograph when the time of the next photographing event is reached.

7 Claims, 3 Drawing Sheets

(56) References Cited

U.S. PATENT DOCUMENTS

| | | | |
|---|---|---|---|
| 9,423,169 B2* | 8/2016 | Kim | F25D 21/02 |
| 10,298,852 B2* | 5/2019 | Miyazaki | H04N 5/2352 |
| 2003/0147371 A1* | 8/2003 | Choi | H04B 7/2637 |
| | | | 370/341 |
| 2004/0136703 A1* | 7/2004 | Sasaki | G03B 17/52 |
| | | | 396/30 |
| 2007/0126866 A1* | 6/2007 | Uchida | G03B 7/26 |
| | | | 348/79 |
| 2011/0221916 A1* | 9/2011 | Kuriyama | H04N 5/23216 |
| | | | 348/220.1 |
| 2011/0249194 A1* | 10/2011 | Horikoshi | H04N 7/0132 |
| | | | 348/730 |
| 2012/0155289 A1* | 6/2012 | Cho | H04W 74/0808 |
| | | | 370/249 |
| 2015/0326774 A1* | 11/2015 | Chinery, III | H04N 7/181 |
| | | | 348/207.1 |
| 2016/0035060 A1* | 2/2016 | Lahmi | G06T 1/0028 |
| | | | 382/100 |
| 2017/0227162 A1* | 8/2017 | Saika | H04N 5/2328 |
| 2017/0230653 A1* | 8/2017 | Tsutsumi | G01M 11/00 |

* cited by examiner

TIME-LAPSE PHOTOGRAPHING CONTROL METHOD AND APPARATUS, READABLE STORAGE MEDIUM, AND CAMERA

CROSS REFERENCE TO RELATED APPLICATION

The disclosure claims the benefits of priority to Chinese Application No. 201710933763.5, filed on Oct. 10, 2017, which is incorporated herein by reference in its entirety.

TECHNICAL FIELD

This disclosure relates to the field of imaging technology, and more particularly to a method, an apparatus, a readable storage medium, and a camera for time-lapse photographing control.

BACKGROUND

Time-lapse photographing, also known as time-lapse shooting, timed photography, or time-lapse photography, is a method for capturing images or video at a low frame rate and displaying the captured images at a normal or increased speed. Utilizing an intervalometer, a shutter can be actuated to shoot a photograph at every interval of time, and a number of photographs can be obtained and displayed continuously after a passage of a length of time. Time-lapse photographing may be used, for example, to capture the blooming of a flower, the dawning of a day, clouds being blown by the wind, etc. A process of time-lapse photographing can require a long period of shooting. Because the process is of a long duration, power consumption needs to be reduced in order to extend the time to support photographing.

A conventional solution place a camera to a sleep mode during the intervals between photographing events to reduce power consumption.

However, when the camera is in the sleep mode, some hardware or software in the camera is still running, resulting in consuming power even in the sleep mode.

SUMMARY

The technical problem addressed by embodiments of this disclosure is how to reduce a camera's power consumption during a time-lapse photographing session.

Embodiments of the disclosure provide a method for controlling time-lapse photographing. The method can include: detecting whether a time-lapse photographing session has ended; determining a time of a next turning-on of the camera in response to the detection that the time-lapse photographing session has not ended, the time of the next turning-on of the camera being earlier than a time of a next photographing event, the time of the next photographing event being a sum of a time of a current photographing event and a time interval between photographing events; configuring a real time clock based on the time of the next turning-on of the camera; shutting down the camera; starting up the camera when the time of the next turning-on of the camera is reached according to the real time clock; and taking a photograph when the time of the next photographing event is reached.

Embodiments of the disclosure further provide a time-lapse photographing control apparatus. The apparatus can include: a memory configured to store a set of instructions; and a processor configured to execute the set of instruction to cause the apparatus to: detect whether a time-lapse photographing session has ended; determine a time of a next turning-on of the camera in response to the detection that the time-lapse photographing session has not ended, the time of the next turning-on of the camera being earlier than a time of a next photographing event, the time of the next photographing event being a sum of a time of a current photographing event and a time interval between photographing events; configure a real time clock based on the time of the next turning-on of the camera; shut down the camera; start up the camera when the time of the next turning-on of the camera is reached according to the real time clock; and take a photograph when the time of the next photographing event is reached.

Embodiments of the disclosure further provide a computer readable storage medium that stores a set of instructions, when executed by at least one processor of an electronic device, cause the electronic device to perform a method for controlling a time-lapse photographing. The method can include: detecting whether a time-lapse photographing session has ended; determining a time of a next turning-on of the camera in response to the detection that the time-lapse photographing session has not ended, the time of the next turning-on of the camera being earlier than a time of a next photographing event, the time of the next photographing event being a sum of a time of a current photographing event and a time interval between photographing events; configuring a real time clock based on the time of the next turning-on of the camera; shutting down the camera; starting up the camera when the time of the next turning-on of the camera is reached according to the real time clock; and taking a photograph when the time of the next photographing event is reached.

DETAILED DESCRIPTION

As described above, when a camera is in sleep mode, some hardware or software in the camera may still be running, resulting in power consumption in the sleep mode.

According to embodiments of the present disclosure, the camera may be shut down after the current photographing event is completed. A real time clock configured with the time of the next turning-on of the camera may be utilized to trigger the camera to start up, and another photographing event may take place. Therefore, the camera's power consumption throughout the entire duration of a time-lapse photographing session can be minimized and the camera's operational time can be maximized, thereby enhancing camera performance and the user experience.

To make the aforementioned purpose, characteristics, and advantages of the present disclosure more evident and easier to understand, detailed descriptions are provided below of specific example embodiments of the present disclosure in reference to the drawings attached.

Figure 1:
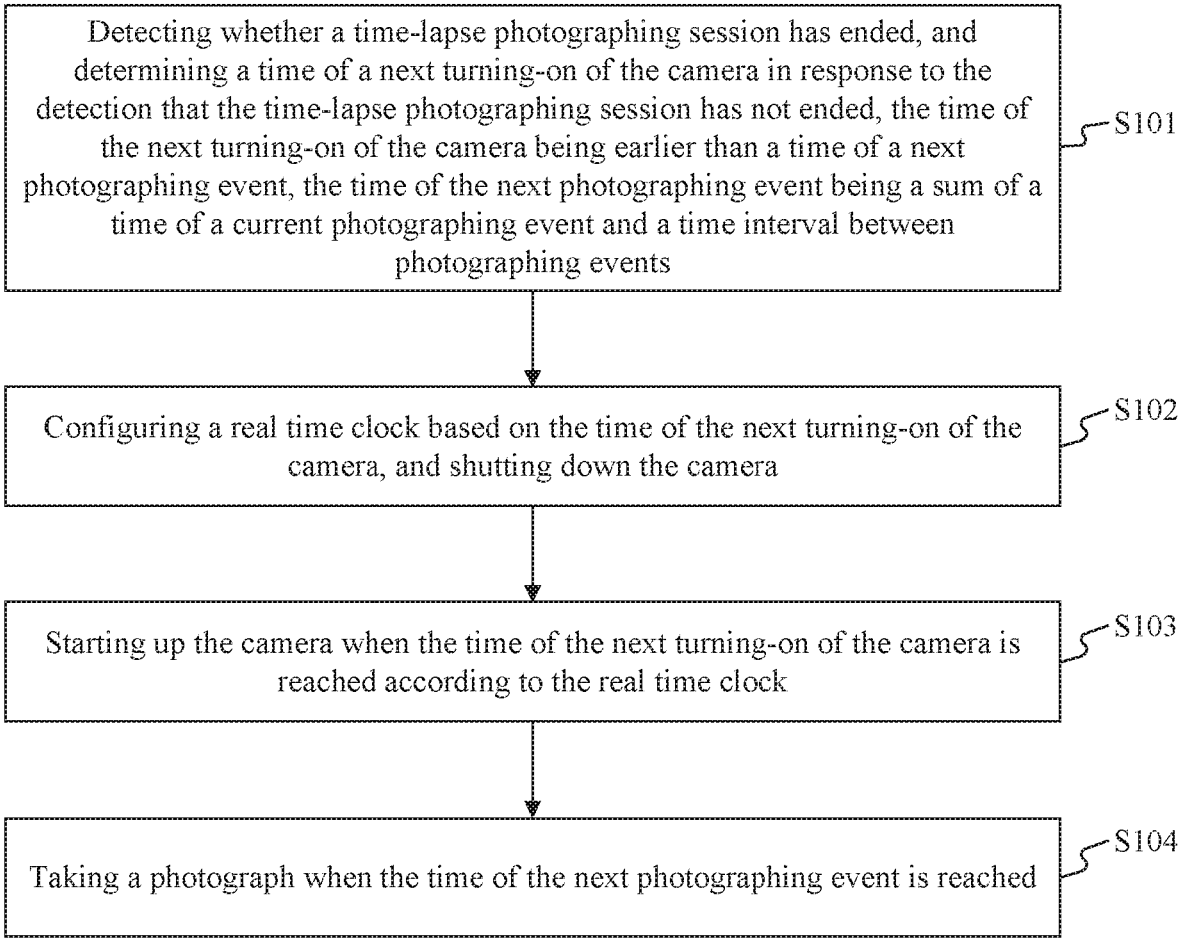
FIG. 1 is a flow diagram illustrating a method for controlling a time-lapse photographing, according to embodiments of the present disclosure.

FIG. 1 is a flow diagram illustrating a method 100 for controlling a time-lapse photographing, according to embodiments of the present disclosure.

Method 100 for controlling a time-lapse photographing illustrated in FIG. 1 may include steps S101-S104. A camera can implement a time-lapse photographing session to perform the time-lapse photographing. The time-lapse photographing session can include a plurality of photographing events. Neighboring photographing events may be spaced by a time interval. The photographing event can, for example, include a shooting.

In step S101, whether the time-lapse photographing session has ended can be detected. In response to the detection that the time-lapse photographing session has not ended, a time of a next turning-on of the camera may be determined. The time of the next turning-on of the camera may be earlier than a time of a next photographing event, and the time of the next photographing event may be a sum of the time of a current photographing event and a time interval between the photographing events.

In step S102, a real time clock may be configured based on the time of the next turning-on of the camera, and the camera may be shut down.

In step S103, when the real time clock reaches the time of the next turning-on of the camera, the camera may be turned on.

In step S104, the camera is caused to take a photograph when the time of the next photographing event is reached.

As discussed above, time-lapse parameters can be configured before the time-lapse photographing session. The time-lapse parameters may include a time-lapse start time, a time-lapse end time, and a time interval between photographing events. The time interval between photographing events may refer to a length of time between two photographing events. For example, the time interval between the photographing events may be two minutes, five minutes, 10 minutes, 30 minutes, 60 minutes, etc.

In step S101, after the camera is caused to complete one photographing event, whether the time-lapse photographing session has ended may be detected. If it is detected that a time-lapse photographing session has not ended, the time of the next turning-on of the camera may be determined to turn on the camera. If it is detected that the time-lapse photographing session has ended, then the time-lapse photographing mode may be exited, or any other desired implementable operation may be executed.

In some embodiments, during the process of a time-lapse photographing session, if a user triggers a button, then the time-lapse photographing session may end. If no button message is detected, then it is indicated that the time-lapse photographing session has not ended.

It is appreciated that, the time of the current photographing event and the time of the next turning-on of the camera are moments in time. Further, the time of the next turning-on of the camera may be a time value of the real time clock.

Because the turning-on of the camera requires a period of time, the time of the next turning-on of the camera may be earlier than the time of the next photographing event, which can also ensure that the camera is able to take a photograph at the time of the next photographing event.

When the camera is in the shut-down state, the real time clock is still running; therefore, in Step S102, the time of the next turning-on of the camera may be utilized to configure a real time clock, and the camera is shut-down. Then, in Step S103, the camera may be started up when the real time clock reaches the time of the next turning-on of the camera.

In other words, when the camera is in a shut-down state, the real time clock can still run, but other hardware or software is not running. Therefore, the real time clock may be used to turn on the camera. Thus, the amount of power consumed by the camera may be reduced by shutting down the camera and having only the real time clock running for the interval between two photographing events.

In some embodiments, the time of the next turning-on of the camera may be written into a register in the real time clock module. When the real time clock reaches the time of the next turning-on of the camera, the real time clock module can trigger a power supply system of the camera to wake the camera's central processing unit (CPU) to start up the camera.

In some embodiments, after the camera has started up, in step S104, when the time of the next photographing event reaches, the camera is caused to take a photograph. Steps S101 through S104 may again be executed repeatedly until the time-lapse photographing session is ended.

During the process of a time-lapse photographing session, other than the final photographing event, steps S101 through S104 illustrated in FIG. 1 may be executed after each photographing event. Or, after exiting the time-lapse photographing mode during the process of a time-lapse photographing session, steps S101 through S104 may no longer be executed.

In some embodiments, the camera is shut down after the current photographing event is completed. A real time clock configured with the time of the next turning-on of the camera may turn on the camera, and start another photographing event. Therefore, the camera's power consumption throughout the entire duration of a time-lapse photographing session may be minimized and the camera's operational time may be maximized, thereby enhancing camera performance and the user experience. Moreover, the camera's power consumption can also be minimized by having the camera shut down during the time intervals between shootings.

In some embodiments, step S101 may include: determining, as the time of the next turning-on of the camera, a difference between the time of the next photographing event and a pre-turning-on time value.

In some embodiments, the pre-turning-on time value may be set in advance. And the time interval between photographing events is also set in advance. The time of the next photographing event is a sum of time of the current photographing event and the time interval between photographing events. Thus, the time of the next turning-on of the camera=the time of the current photographing event+the time interval between photographing events−the value of the pre-turning-on time value.

Here, the pre-turning-on time value may indicate a length of time for the camera to turn on. A value of the pre-turning-on time value may be adaptively set at, for example, 2 seconds, 15 seconds, etc., and it is not limited by example embodiments of the present disclosure.

In some embodiments of this disclosure, step S104 illustrated in FIG. 1 may include: determining the time of the next photographing event according to the time of the current photographing event and the time interval between photographing events; and when the time of the next photographing event is reached, taking a photograph.

In some embodiments, after the camera is turned on, the time of the next photographing event may be determined by calculation, and the timer is set and started up, and another photograph is taken when the time of the next photographing event is reached.

In some embodiments of the present disclosure, the time of the next photographing event may be determined and stored before the camera shuts down. And then after the camera is started up, the time of the next photographing event is read in order to take another photograph. The precision of the photographing can be ensured by means of storing and reading the time of the next photographing event.

Figure 2:
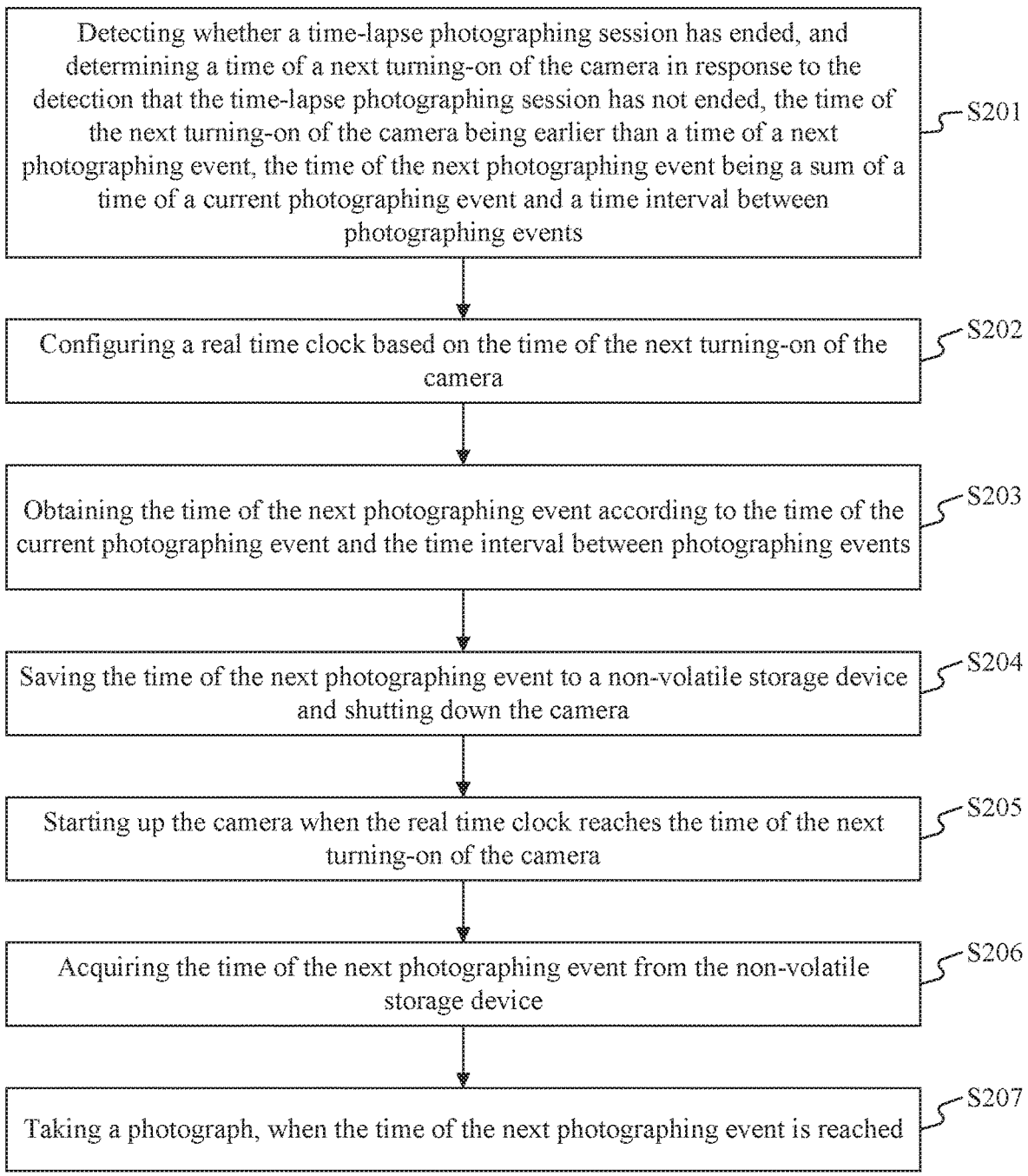
FIG. 2 is a flow diagram illustrating another method for controlling a time-lapse photographing, according to embodiments of the present disclosure.

FIG. 2 is a flow diagram illustrating another method 200 for controlling a time-lapse photographing, according to embodiments of the present disclosure. Method 200 for controlling a time-lapse photographing may include S201-S207.

In step S201, whether the time-lapse photographing session has ended may be detected, and in response to the detection that the time-lapse photographing session has not ended, a time of a next turning-on of the camera may be determined. The time of the next turning-on of the camera may be earlier than a time of a next photographing event, and the time of the next photographing event may be a sum of the time of a current photographing event and a time interval between the photographing events.

In step S202, a real time clock may be configured based on the time of the next turning-on of the camera.

Steps S201-S202 are substantially the same as steps S101 and S102. Detailed description of steps S201 through S202 can be found in steps S101 through S102 illustrated in FIG. 1.

In step 203, the time of the next photographing event may be obtained according to the time of the current photographing event and the time interval between photographing events.

In step S204, the time of the next photographing event may be saved to a non-volatile storage device and the camera may be shut down.

In some embodiments, because a non-volatile storage device does not lose data when its power is cut off, the time of the next photographing event may be saved in a non-volatile storage device such that the time of the next photographing event may still be obtained from the non-volatile storage device after the camera has been shut down and then started up again. It should be noted that the time of the next turning-on of the camera is used for configuring the real time clock and therefore need not necessarily be stored in the non-volatile storage device.

In step S205, the camera may be started up, when the real time clock reaches the time of the next turning-on of the camera.

In step S206, the time of the next photographing event may be acquired from the non-volatile storage device.

In step S207, a timer may be used for timing, and, when the time of the next photographing event is reached, the camera may take a photograph.

In some embodiments, after the real time clock reaches the time of the next turning-on of the camera, a signal to start up the camera may be sent to the power supply management module by means of hardware signaling.

After the camera is started up, the time of the next photographing event is obtained from the non-volatile storage device, the timer is started up, and, when the timer reaches the time of the next photographing event, another photograph is taken. And, the photograph may be saved.

Further, step S204 may include: determining a Cyclic Redundancy Check (CRC) value of the data to be stored, and associating the CRC value with the data to be stored. Therefore, the data to be stored can be checked at the time of reading it. And the data to be stored may include the time of the next photographing event.

In some embodiments, by means of determining and storing the CRC value for the data to be stored, accuracy of data retrieval can be ensured. Thus, the normal execution of the time-lapse photographing function may be ensured when the camera is configured with a plurality of types of time-lapse photographing parameters.

For example, in the non-volatile storage device, the structure of data to be stored may include a header, data, and a CRC value.

Here, the header may indicate a type and a length of the data. The data can include valid data. The CRC value is a check value for verifying the data. Each time when the data and header are updated, the CRC value may be updated synchronously so that abnormal damage to the data can be avoided and the use of erroneous values can be eliminated;

The process for writing in the data to be stored and the CRC value can include: filling data in the header according to the length of the data; determining the CRC value according to the header and the data; writing the header, the data, and the CRC value into the non-volatile storage device. In some embodiments, the data type may be fixed and the length of the data may be updated.

Further, step S206 may include: reading the data to be stored from the non-volatile storage device; determining a CRC check code for the data to be stored; if the CRC check code is consistent with the CRC value, then using the data to be stored as the time of the next photographing event.

In some embodiments, the process of reading the data to be stored from the non-volatile storage device can include: reading the header from the non-volatile storage device; obtaining the length of the data and the value of the data, according to the header; determining the CRC value according to the header and the data; comparing the determined CRC value with the stored CRC value; if the result of the comparison indicates that the two CRC values are consistent, then the data is usable and the read data is utilized to continue the photographing operation, otherwise, the stored data is not used and the photographing process automatically ends.

Figure 3:
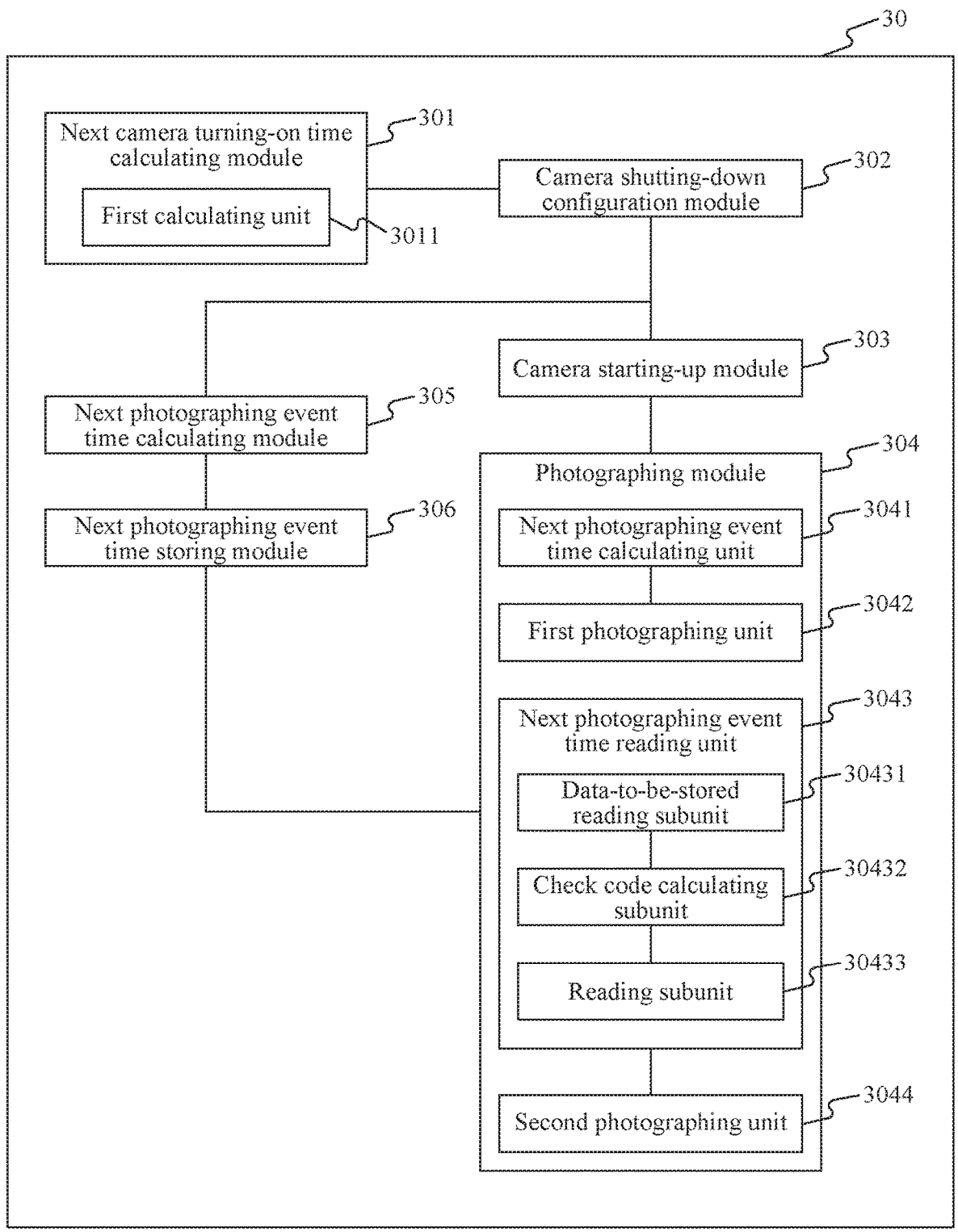
FIG. 3 is a structural diagram illustrating a time-lapse photographing control apparatus, according to embodiments of the present disclosure.

FIG. 3 is a structural diagram illustrating a time-lapse photographing control apparatus 30, according to embodiments of the present disclosure.

The time-lapse photographing control apparatus 30 illustrated in FIG. 3 may include a next camera turning-on time calculating module 301, a camera shutting-down configuration module 302, a camera starting-up module 303, and a photographing module 304.

Here, the next camera turning-on time calculating module 301 is adapted to calculate a time of the next turning-on of the camera if, after the camera has been caused to take a photograph, it is detected that a time-lapse photographing session has not ended, the time of the next turning-on of the camera being earlier than the time of the next photographing event, the time of the next photographing event being the sum of the time of the current photographing event and the time interval between shootings; the camera shutting-down configuration module 302 is adapted to utilize the time of the next turning-on of the camera to configure a real time clock, and shut down the camera; the camera starting-up module 303 is adapted to start up the camera when the real time clock reaches the time of the next turning-on of the camera; the photographing module 304 is adapted to cause the camera to take a photograph when the time of the next photographing event is reached.

In some embodiments of the present disclosure, the camera is shut down after the current photographing event is completed; a real time clock configured with the time of the next turning-on of the camera is utilized to trigger the camera to start up, and another photographing event takes place, so as to minimize the camera's power consumption throughout the entire duration of a time-lapse photographing session and maximize the camera's operational time, thereby enhancing camera performance and the user experience.

In some embodiments, the next camera turning-on time calculating module 301 may include a first calculating unit 3011 adapted to calculate the difference between the time of the next photographing event and the preset advance starting-up time value to be used as the time of the next turning-on of the camera.

In some embodiments of the present disclosure, the photographing module 304 may include a next photographing event time calculating unit 3041 adapted to calculate and obtain the time of the next photographing event according to the time of the current photographing event and the time interval between shootings; a first photograph-taking unit 3042 adapted to utilize a timer for timing, and, when the time of the next photographing event is reached, cause the camera to take a photograph.

In some embodiments of the present disclosure, the time-lapse photographing control apparatus 30 illustrated in FIG. 3 may further comprise a next photographing event time calculating module 305 adapted to calculate and obtain the time of the next photographing event according to the time of the current photographing event and the time interval between shootings; a next photographing event time storing module 306 adapted to save the time of the next photographing event to a non-volatile storage device.

Further, the photographing module 304 may include a next photographing event time reading unit 3043 adapted to read the time of the next photographing event from the non-volatile storage device; a second photograph-taking unit 3044 adapted to utilize a timer for timing, and, when the time of the next photographing event is reached, cause the camera to take a photograph.

Further, the next photographing event time storing module 306 calculates a CRC value for data to be stored, and stores the CRC value together with the data to be stored, in order to be used to check, at the time of reading, the data to be stored, the data to be stored comprising the time of the next photographing event.

Further, the next photographing event time reading unit 3043 may include: a data-to-be-stored reading subunit 30431 adapted to read the data to be stored from the non-volatile storage device; a check code calculating subunit 30432 adapted to calculate the CRC check code for the data to be stored; a reading subunit 30433 adapted to use the data to be stored as the time of the next photographing event if the CRC check code is consistent with the CRC value.

Please refer to the relevant descriptions in FIGS. 1-2 for more information on the principles and ways of operating for time-lapse photographing control apparatus 30; no redundant description is detailed here.

Some embodiments of the present disclosure further disclose a readable storage medium storing a set of computer instructions. The steps in the time-lapse photographing control method illustrated FIG. 1 or FIG. 2 may be executed when the set of computer instructions is executed. The storage medium may include at least one of a ROM, a RAM, a magnetic disk, and an optical disc.

Some embodiments of the present disclosure further disclose a camera including a storage device (e.g., a memory) and a processor. The storage device may store a set of computer instructions that is executable by the processor. The steps in the time-lapse photographing control method illustrated in FIG. 1 or FIG. 2 may be executed when the processor executes the set of computer instructions. The camera includes, but is not limited to, a single-lens reflex camera, a Micro Four Thirds camera, a digital camera, a sports camera, and other cameras.

Notwithstanding the above disclosure of the present invention, it does not limit the present invention. Any person of skill in the art may make various alterations and changes that are not detached from the spirit and scope of the present invention; therefore, the scope of protection for the present invention should be that as defined by the claims.

What is claimed is:

1. A method for controlling time-lapse photographing, comprising:

detecting whether a time-lapse photographing session has ended;

determining a time of a next turning-on of the camera in response to the detection that the time-lapse photographing session has not ended, the time of the next turning-on of the camera being earlier than a time of a next photographing event, the time of the next photographing event being a sum of a time of a current photographing event and a time interval between photographing events;

configuring a real time clock based on the time of the next turning-on of the camera;

obtaining the time of the next photographing event according to the time of the current photographing event and the time interval between photographing events;

determining a Cyclic Redundancy Check (CRC) value for data of the time of the next photographing event;

saving the data of the time of the next photographing event and the CRC value to a non-volatile storage device;

shutting down the camera;

starting up the camera when the time of the next turning-on of the camera is reached according to the real time clock;

reading the data of the time of the next photographing event from the non-volatile storage device;

determining a CRC check code for the data the time of the next photographing event;

if the CRC check code is consistent with the CRC value, using the saved data of the time of the next photographing event as the time of the next photographing event; and when the time of the next photographing event is reached, taking the photograph.

2. The method according to claim 1, wherein determining the time of the next turning-on of the camera further comprises:

determining, as the time of the next turning-on of the camera, a difference between the time of the next photographing event and a pre-turning-on time value.

3. The method according to claim 1, further comprising:

obtaining the time of the next photographing event according to the time of the current photographing event and the time interval between photographing events.

4. A time-lapse photographing control apparatus, comprising:

a memory configured to store a set of instructions; and
a processor configured to execute the set of instruction to cause the apparatus to:
- detect whether a time-lapse photographing session has ended;
- determine a time of a next turning-on of the camera in response to the detection that the time-lapse photographing session has not ended, the time of the next turning-on of the camera being earlier than a time of a next photographing event, the time of the next photographing event being a sum of a time of a current photographing event and a time interval between photographing events;
- configure a real time clock based on the time of the next turning-on of the camera;
- obtain the time of the next photographing event according to the time of the current photographing event and the time interval between photographing events;
- determine a Cyclic Redundancy Check (CRC) value for data of the time of the next photographing event;
- save the data of the time of the next photographing event and the CRC value to a non-volatile storage device;
- shut down the camera;
- start up the camera when the time of the next turning-on of the camera is reached according to the real time clock;
- read the data of the time of the next photographing event from the non-volatile storage device;
- determine a CRC check code for the data the time of the next photographing event;
- if the CRC check code is consistent with the CRC value, use the saved data of the time of the next photographing event as the time of the next photographing event; and
- when the time of the next photographing event is reached, take the photograph.

5. The apparatus according to claim 4, wherein the processor is further configured to execute the set of instruction to cause the apparatus to determine the time of the next turning-on of the camera by:
- determining, as the time of the next turning-on of the camera, a difference between the time of the next photographing event and a pre-turning-on time value.

6. The apparatus according to claim 4, wherein the processor is further configured to execute the set of instruction to cause the apparatus to:
- obtain the time of the next photographing event according to the time of the current photographing event and the time interval between photographing events.

7. A non-transitory computer readable storage medium that stores a set of instructions, when executed by at least one processor of an electronic device, cause the electronic device to perform a method for controlling a time-lapse photographing, the method comprising:
- detecting whether a time-lapse photographing session has ended;
- determining a time of a next turning-on of the camera in response to the detection that the time-lapse photographing session has not ended, the time of the next turning-on of the camera being earlier than a time of a next photographing event, the time of the next photographing event being a sum of a time of a current photographing event and a time interval between photographing events;
- configuring a real time clock based on the time of the next turning-on of the camera;
- obtaining the time of the next photographing event according to the time of the current photographing event and the time interval between photographing events;
- determining a Cyclic Redundancy Check (CRC) value for data of the time of the next photographing event;
- saving the data of the time of the next photographing event and the CRC value to a non-volatile storage device;
- shutting down the camera;
- starting up the camera when the time of the next turning-on of the camera is reached according to the real time clock;
- reading the data of the time of the next photographing event from the non-volatile storage device;
- determining a CRC check code for the data the time of the next photographing event;
- if the CRC check code is consistent with the CRC value, using the saved data of the time of the next photographing event as the time of the next photographing event; and
- when the time of the next photographing event is reached, taking the photograph.

* * * * *